(12) United States Patent
Markey et al.

(10) Patent No.: US 9,796,090 B2
(45) Date of Patent: Oct. 24, 2017

(54) SYSTEM ARCHITECTURE FOR CONTROL SYSTEMS VIA KNOWLEDGE LAYOUT SEARCH

(71) Applicant: Accenture Global Services Limited, Dublin (IE)

(72) Inventors: Nigel Robert Markey, London (GB); Karthik Gomadam, San Jose, CA (US); Teresa Sheausan Tung, San Jose, CA (US); Desmond Duggan, San Francisco, CA (US); Allan Enemark, Campbell, CA (US); Kunal Taneja, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 125 days.

(21) Appl. No.: 14/695,409

(22) Filed: Apr. 24, 2015

(65) Prior Publication Data

US 2016/0311113 A1 Oct. 27, 2016

(51) Int. Cl.
*G05B 19/04* (2006.01)
*G05B 19/18* (2006.01)
(Continued)

(52) U.S. Cl.
CPC ............. *B25J 9/1674* (2013.01); *B25J 9/163* (2013.01); *B25J 11/00* (2013.01); *B25J 13/02* (2013.01);
(Continued)

(58) Field of Classification Search
CPC ... B25J 11/00; B25J 13/02; B25J 13/08; B25J 13/084; B25J 9/16; B25J 9/163;
(Continued)

(56) References Cited

U.S. PATENT DOCUMENTS 6,340,875 B1 1/2002 Watanabe et al.
2005/0144262 A1 6/2005 Kang et al.
(Continued)

FOREIGN PATENT DOCUMENTS

EP 2 500 787 A1 9/2012

OTHER PUBLICATIONS

Bizer, C., et al., Linked data—the story so far, 2009, pp. 122-147, vol. 5, No. 3, International Journal of Semantic and Web Information Systems, United States of America.
(Continued)

*Primary Examiner* — Rachid Bendidi
(74) *Attorney, Agent, or Firm* — Brinks Gilson & Lione

(57) ABSTRACT

A system maintains, generates, and manages layouts that map resources to control states of a robotic apparatus. The system may receive system control queries and produce search results and contextual information in response. The system may reference the system control queries against the layouts to determine the search results and contextual information. The contextual information may include operator-interactive tools that may be used to control the robotic apparatus. To control the apparatus, the system may generate control state update messages responsive to the operator interactions. The control state update messages may be sent to a control interface of the robotic device. The robotic device may execute an action responsive the receipt of the control state update message.

20 Claims, 10 Drawing Sheets

(51) Int. Cl.
- B25J 9/16 (2006.01)
- G05B 17/02 (2006.01)
- G05B 19/042 (2006.01)
- B25J 11/00 (2006.01)
- B25J 13/02 (2006.01)
- B25J 13/08 (2006.01)

(52) U.S. Cl.
CPC ............ B25J 13/084 (2013.01); G05B 17/02 (2013.01); G05B 19/0426 (2013.01); *G05B 2219/34345* (2013.01); *Y10S 901/02* (2013.01); *Y10S 901/09* (2013.01)

(58) Field of Classification Search
CPC ....... B25J 9/1694; B25J 9/1695; G05B 17/02; G05B 19/0426; G05B 2219/34345; Y10S 901/02; Y10S 901/09
See application file for complete search history.

(56) References Cited

U.S. PATENT DOCUMENTS

| | | | |
|---|---|---|---|
| 2006/0184615 A1 | 8/2006 | Park et al. | |
| 2008/0004749 A1* | 1/2008 | Hostettler | G05D 1/0044 700/245 |
| 2010/0312388 A1* | 12/2010 | Jang | G06Q 10/0631 700/248 |
| 2012/0239169 A1* | 9/2012 | Smith | G05B 17/02 700/83 |
| 2013/0073487 A1 | 3/2013 | Reisman | |
| 2015/0081701 A1 | 3/2015 | Lerios et al. | |

OTHER PUBLICATIONS

Lambda architecture, http://lambda-architecture.net/, pp. 1-3, accessed Oct. 7, 2015.

Lambda architecture: A state-of-the-art, http://www.datasalt.com/2014/01/lambda-architecture-a-state-of-the-art/, pp. 1-4, accessed Oct. 6, 2015.

Lassila, O., et al., Resource Description Framework (RDF) Model and Syntax Specification, Feb. 22, 1999, pp. 1-45, W3C Consortium, Cambridge, Massachusetts.

Balduini, M., et al., Social listening of City Scale Events using the Streaming Linked Data Framework, Oct. 21-25, 2013, pp. 1-16, The Semantic Web—ISWC 2013, Sydney, Australia.

Prudhommeaux, E., et al., Sparql query language for rdf, 2008, pp. 1-93, W3C Consortium, Cambridge, Massachusetts.

Llaves, A., et al., Towards Efficient Processing of RDF Data Streams, 2003, pp. 45-53, Software Architecture, Springer Publishing Company, New York, New York.

Le-Phuoc, D., et al., A Native and Adaptive Approach for Unified Processing of Linked Streams and Linked Data, 2011, pp. 370-388, The Semantic Web, Springer Publishing Company, New York, New York.

Stonebraker, M., et al., "One Size Fits All": An Idea Whose Time Has Come and Gone, 2005, pp. 2-11, Proceedings of $21^{st}$ International Conference on ICDE, IEEE Computer Society, Piscataway, New Jersey.

Binz, T., et al., Portable Cloud Services Using TOSCA, 2012, pp. 80-85, IEEE Internet Computing, No. 3, IEEE Computer Society, Piscataway, New Jersey.

Martinez-Prieto, M.A., et al., The Solid architecture for real-time management of big semantic data, 2015, pp. 62-79, Elsevier B.V., The Netherlands.

Cuesta, C.E., et al., Towards an Architecture for Managing Big Semantic Data in Real-Time, 2013, pp. 45-53, Springer Publishing Company, New York, NY.

Weng, L., et al., An Approach for Automatic Data Virtualization, 2004, pp. 24-33, Proceedings of $13^{th}$ IEEE International Symposium on High performance Distributed Computing, IEEE Computer Society, Piscataway, New Jersey.

Patni, H., et al., Linked Sensor Data, 2010, pp. 362-370, 2010 International Symposium on Collaborative Technologies and Systems (CTS), IEEE Computer Society, Piscataway, New Jersey.

Third Examiner's Report, Australian App. No. 2016201167, Jan. 23, 2017, pp. 1-9, Australian Government, IP Australia.

\* cited by examiner

SYSTEM ARCHITECTURE FOR CONTROL SYSTEMS VIA KNOWLEDGE LAYOUT SEARCH

TECHNICAL FIELD

This disclosure relates to a complex system architecture and analytics engine for building, maintaining, and searching layouts for operation of control systems.

DETAILED DESCRIPTION

Figure 1:
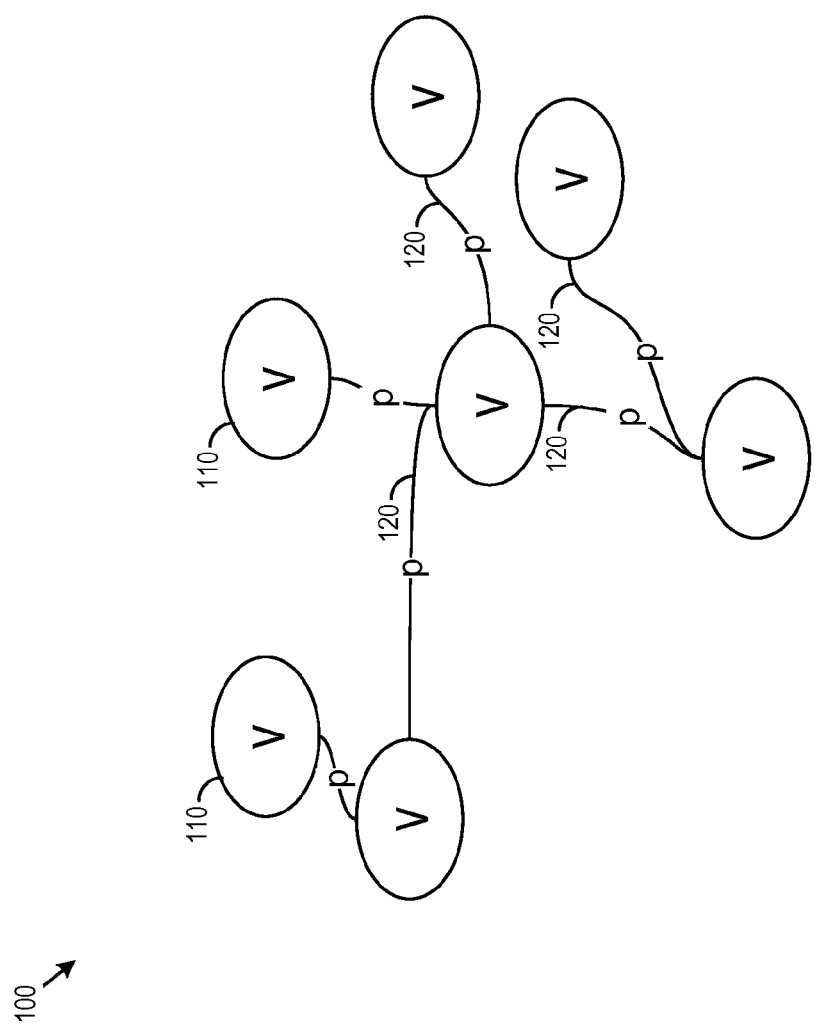
FIG. 1 shows an example knowledge layout.

Described below is a control system that may use knowledge graph based searches to generate system control query results. The system may receive system control queries generated by operator's search for resources related to actions or assets as part of a control system. The resources may be obtained from diverse locations associated to various logical and hierarchical groupings with varying access rules and parameters. The knowledge layout may store relationship data such as keys, protocols, access indices, logical interpretation, other access parameters and rules within a mapping of the resources to control state outputs of the robotic control system.

The sensor-actuator control system may control or monitor industrial actuation and sensor systems, individual actuators or sensors, portions of actuation or sensor systems, computer-controlled kinematic systems, electro-mechanical devices or other robotic apparatuses. For example, the knowledge layout may be used to access resources for evaluating the state (e.g., future or current) of or executing control of an actuator or series of actuators controlling fluid flow in a gas or liquid supply system, e.g., natural gas, water, oil, or other chemicals. In another example, the knowledge layout may be used to access resources for control of automated, provisioning, loading, packing, or unpacking of a supply chain delivery system. In another example, within power plants, substations and other parts of an electricity transmission network, electrical transformers could have control exerted over them via the robotic control system in order to enhance and manage transmission within the network.

An operator may input a system control query, which may be a natural language string, a Boolean-operator-based search, image, audio input, or other system input. The system may reference the system control query against the knowledge layout. The system may then generate search results based on the knowledge layout. For example, the system may compare the system control query to descriptors of resources, relationship data, or control states present within the layout. Additionally or alternatively, the search results may be based on historical selections by other operators. For example, the search results that are viewed or last viewed by previous operators using the same or a similar system control query may be ranked higher in the search result listing.

In some cases, along with the search results, the system may present contextual information gleaned from the knowledge layout. The knowledge layout may include a mapping of relationship information between multiple resources, control states, commands, entities, or other objects. Thus, the position of a resource or control state may indicate related context from surrounding connected resources and control states. Hence, resources available from any one or more of the search results may be presented or described within the contextual information. In some cases, portions of the knowledge layout may be graphically presented in the display to show the interconnection of resources or control states. For example, various ones of the search results may allow for access to resources or control states. The contextual information may present a graphical presentation of a knowledge layout comprising indicators for the corresponding search results near the locations of the resources and control states on the graphical knowledge layout. In another example, the relationships on the knowledge layout may be used to generate a text-based description of how resources relate to other resources or control states.

The knowledge layout may also map physical structural relationships among resources. For example, in a knowledge layout for a water or electrical utility system, flow, capacity, pressure, tolerance and material quality from a trunk to a branch may be mapped. For example, the water mains that supply a district metered area (DMA) may be mapped to the DMA with a "supplied by" relationship edge. This district metered area may be mapped to a specific Control System or Interfaces with a "has control system" relationship edge. Thus, control relationships and physical relationships may be mapped on the knowledge layout.

Additional logical hierarchies may be added as needed. For example, the mapping instances of equipment to a particular manufacturer or maintenance entity. Thus, relationships may be added to support use cases not defined a priori.

The system architecture may use layouts to represent the relationship mappings of resources and control states. FIG. 1 shows an example knowledge layout 100. The example layout 100 includes vertices 110 and edges 120. Edges may also be assigned properties 'p' that describe a predicate relationship, e.g. a relationship identifying how to the connected vertices interact. Additionally or alternatively, the system can attach rules to the individual vertices 'v'. The attached rules may govern which edges may be attached to a vertex. The allowed edges may define basic operations that may be used on the resources represented by the individual vertices 'v'. For example, if a resource is stored within an object storage database the knowledge layout may map the resource to the database using an edge. The property for the edge may include a protocol for accessing the database. Further, the property may include a key or index for accessing the resource in the object storage database.

Figure 2:
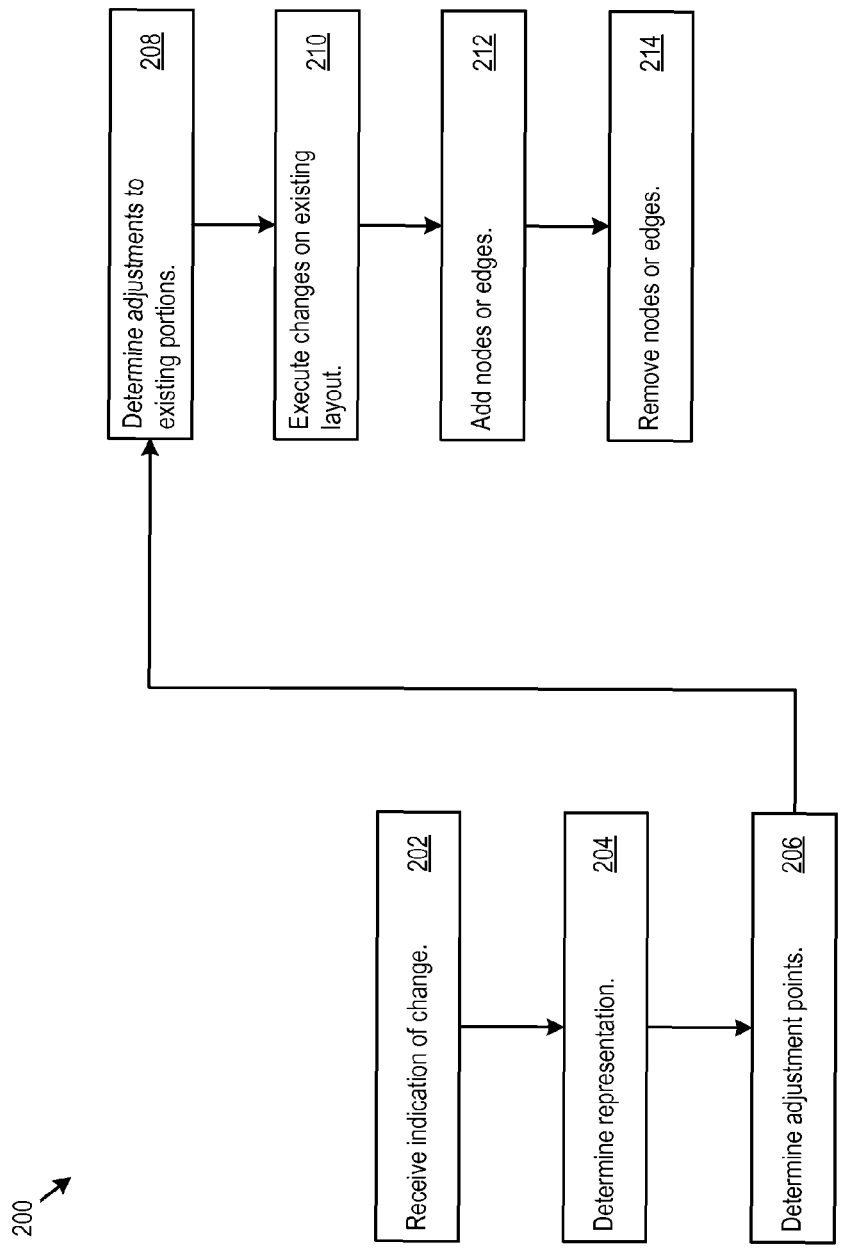
FIG. 2 shows layout manipulation logic (LML).

The system architecture may generate and update knowledge layouts to accommodate new robotic systems, resources, or changes to the capabilities of existing controlled systems. FIG. 2 shows layout manipulation logic (LML) 200 which may be implemented in circuitry. The LML 200 may receive an indication of a resource change or control state availability change (202). For example, a resource change may occur when sensor data is stored in a new location or sensors are added to the robotic control system. In another example, a new control state may be onboarded when actuators or other robotic devices are added to the controlled system. Responsive to the resource or control state availability change the LML 200 may determine a representation of the adjustment (204). For example, the LML 200 may determine a new executable path or path through the representing the change. In another example, the LML 200 may determine a path that may be removed responsive to a capability change. The LML 200 may determine adjustment points for the knowledge layout (206). For example, LML 200 may determine overlap between the knowledge layout and the representation being onboarded or offloaded. The LML 200 may determine adjustments to existing portions of the knowledge layout (208). The LML 200 may execute changes on the existing knowledge layout (210). The LML 200 may add nodes or edges to the layout where the representation and the existing nodes do not share common nodes or edges (212). The LML 200 may remove nodes or edges for resources or control states that are no longer, accessible, in existence, or are otherwise removed (214).

Figure 3:
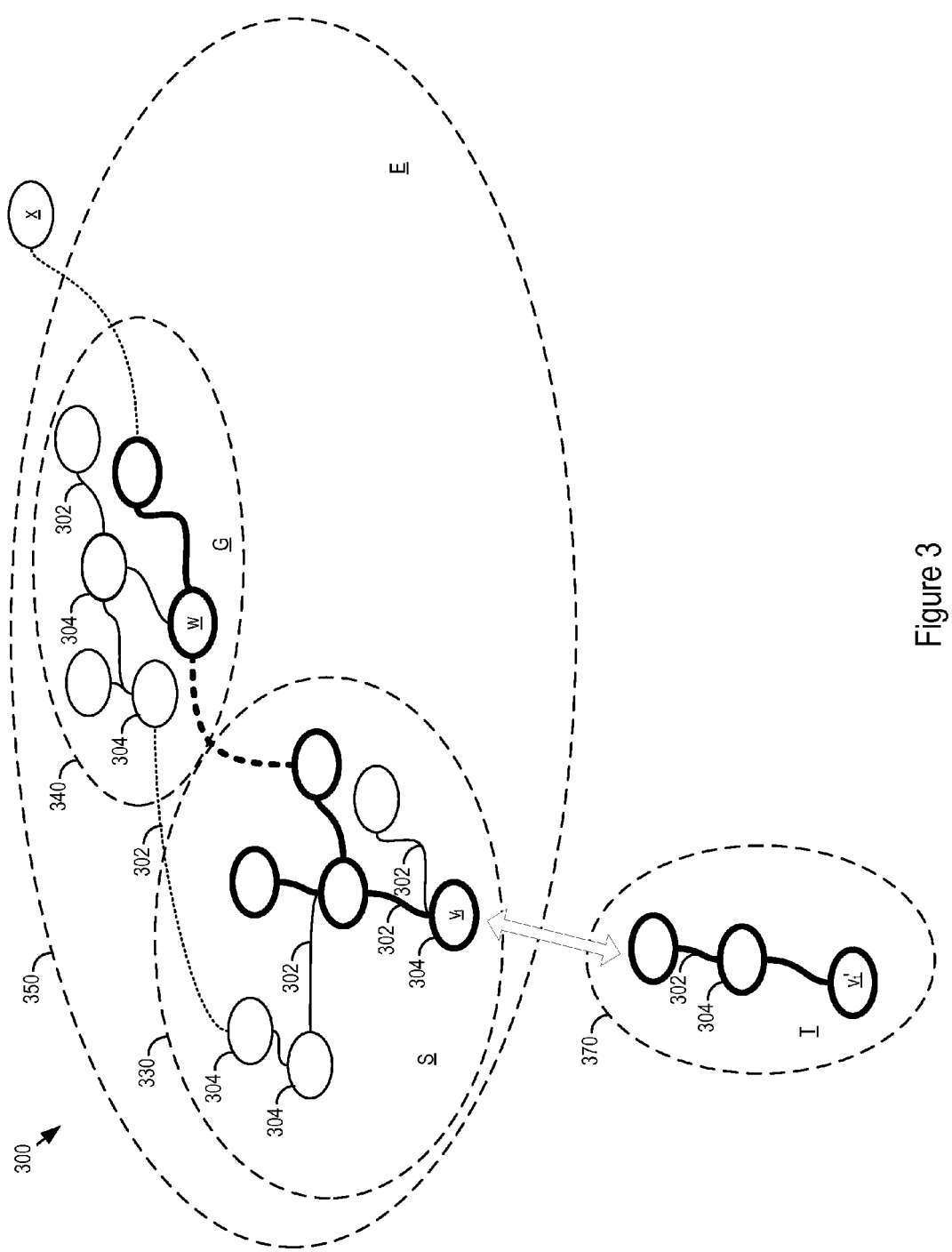
FIG. 3 show an example graph of an extension to an existing layout.

FIG. 3 shows an example 300 of an extension to an existing layout. Portion S 330 may correspond to the unextended existing layout and may include edges 302 and nodes 304. The unexpended existing layout, portion S 330, may be extended with additional domains by, for instance, mapping an additional domain G 340 to a subset of S 330. The resultant portion E 350 is an extension that includes S 330, G 340, and how the domain G 340 relates to S 330. Extension refers to mapping S330 and G340 with a relationship like 'same as' that then allows logic from both graphs to be used to reason over the extended graph. Thus E 350 is the extended layout of S 330, which captures the mapping the extension G 340 to S 330.

To on-board a new data store or multiple stores, contextual environment information, or subject domain expertise information to an existing layout (portion S 330), the system may generate a new layout portion T 370 that includes subclasses and types from a sub-layout of the existing layout S 330.

For node $v_t$ from the portion S, a new node $v_t'$ in T 370 that inherits attributes, properties, and rules associated from $v_t$ in S 330. In some implementations, T 370 may also capture additional attributes, properties, and vertices and edges not included S 330. For example, T 370 may rely on portions of the extended layout E 350. Additionally or alternatively, T 370 may remove attributes, properties, vertices, and edges in S 330.

The LML 200 may check that $v_t'$ adheres to inherited rules. The LML 200 may also generate indicators of exceptions where $v_t'$ in T 370 does not adhere to a rule for $v_t$. The LML 200 may then relate $v_t'$ to $v_t$ by applying a property. For example, the nodes may be related using the property: 'subclass_of and/or another relationship. This relationship may be generalized to connect T 370 and S 330. Additionally, the relationship generation may be repeated for nodes v' within T. The LML 200 may then replace S 330 as the existing layout with the connected T 370 and S 330 layout to accommodate the on-boarded capabilities.

Additionally or alternatively, an input to the LML 200 may specify an instance T 370 of the existing layout S 330, where T 370 captures a specific configuration of a subset of S. For example, the input may be supplied from a user interface, such as a wizard application, that facilitates navigation from an initial subset of vertices v in S 330 and queries the user about which vertices include and how to configure the vertices and edges in the selected subset. The subset of S 330 that is presented to the user may depend on the initial location of the vertex in S 330 and the rules to the attached vertex and the edges.

Once the input indicates the inclusion of a node v from S, the system may create a vertex v' in T 370 that inherits attributes, properties, and rules associated v in S 330. In some cases, the LML 200 may attach instance specific properties to selected vertices and edges.

As discussed above, T 370 may include elements, such as attributes, properties, and vertices and edges, not in S 330 or may omit elements present in S 330. The LML 200 may check that vertices adhere to inherited rules. The LML 200 may also generate indicators of exceptions where vertices in T 370 do not adhere to one or more rules form S 330. Additionally or alternatively, a template may be used to identify a subset of S 330 that forms T.

Figure 4:
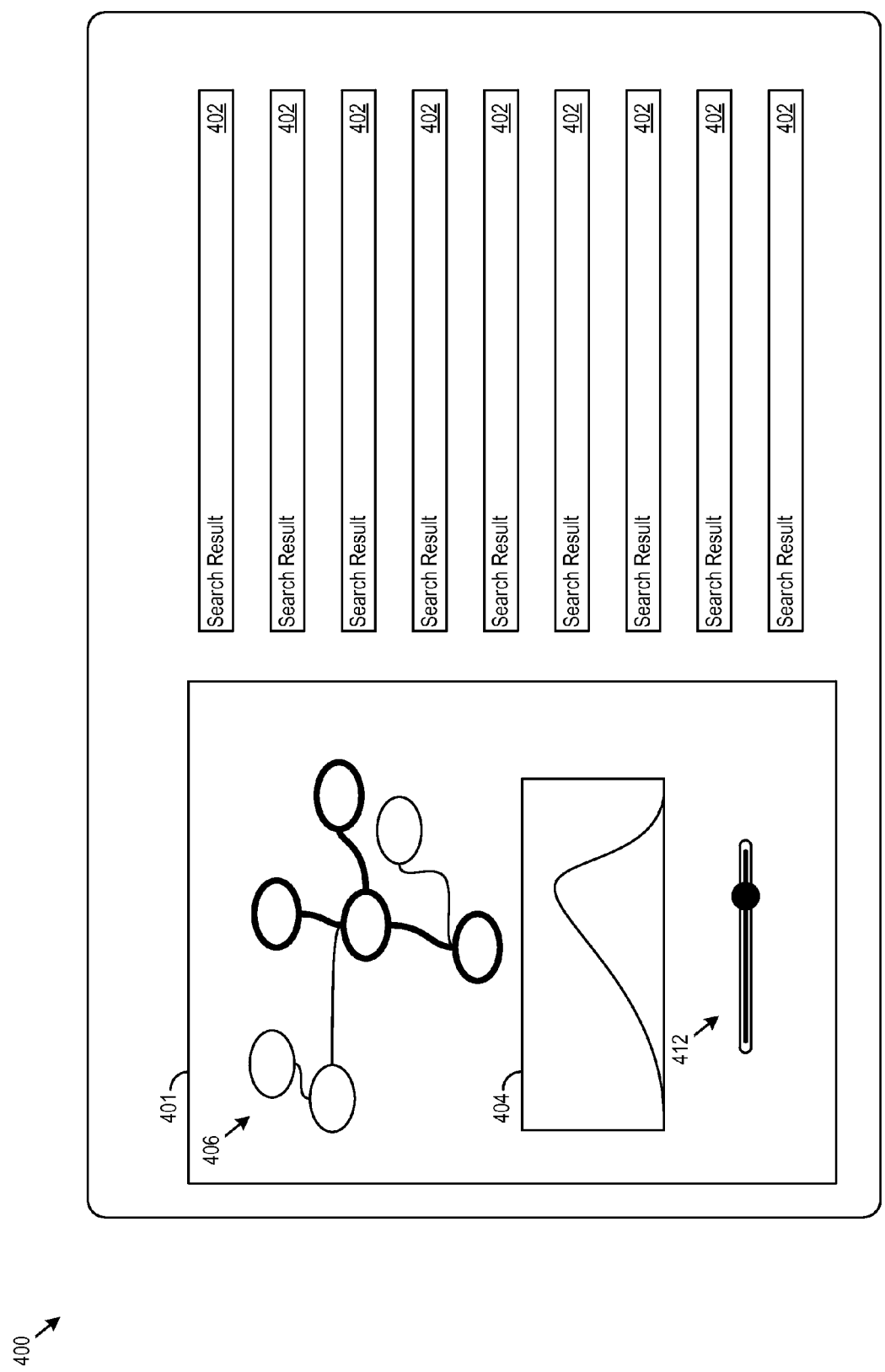
FIG. 4 shows example an example interactive contextual information display.

FIG. 4 shows example an example interactive contextual information display (CID) 400. The example CID shows contextual information 401 and search results 402 for a robotic apparatus. The example CID 400 may be generated in response to a system control query for the robotic apparatus. The CID 400 may include informational displays such as graphs 404 or historical data. Suggested alternate queries, physical maps, and text information. The CID 400 may also include user-interactive tools such as controls 412 for the DMA system or layout portions 406 from which an operator may select resources or control states for manipulation. The contextual information may also include warnings responsive to user-interactions or to status information at the time of the system control query.

An operator may interact with the user-interactive tools through graphical user interface (GUI) and human interface devices (HIDs) such as touch panels, movable cursors, gestures, nobs, switches, levers, dials, voice control or any combination thereof. The operator may receive haptic feedback in response to their action on a HID.

The user-interactive tools may include switches, slide bars, toggle switches, tagged images, or other interactive displays. The user-interactive tools may present a layer of abstraction to the operator. For example, a switch or slide bar may control any number of individual actuators. The operator may be appraised of an effect of manipulating the user-interactive tool rather than an exact displacement outcome. For example, a slide bar may indicate a target pressure change, but manipulation of the slide bar causes an un-displayed number of actuators to move. In some cases, the operator may have access to the abstracted layer below the user-interactive tool and determine which actuators are involved in a command response from a user-interactive tool.

In some cases the contextual information may include a dynamic model of the complex system. An operator may manipulate controls, and the model may update in response to the control inputs. Thus, the operator may view simulations of the effects of different control selections on a nonlinear system. Once the operator is satisfied with the simulated results, the operator may select a submit command option, e.g., a "submit to actuators" button. Therefore, the operator may confirm that a selection may produce a desired result ahead of making changes to the control state of the system.

The contextual information may also include options that allow autopiloting of the robotic system via the knowledge layout. A numerical model, combining the dynamic model of the system alongside a linear programming model, may be used with sensor data may be used to determine how to achieve a given target state for the system. In some cases, operator may supply the target state via the autopilot control. The numerical model may be periodically recomputed to maintain system performance within a tolerance of the target state. In some cases, the operator may also select the tolerance. The re-computation rate may increase as the tolerance range narrows.

The target state may include a variety of conditions. For example, the target state for a water supply network may include a combination of pressure and flow. Cost minimization constraints may also be implemented as target states. For example, in oil or natural gas supply meeting target physical measures such a flow and pressure may be deemphasized in favor of reducing delivery costs and waste.

For some conditions, e.g. cost minimization, production maximization, or other conditions, a genetic decision process may be implemented. The operator may select a series of controllable characteristics about the system being managed, e.g., plant production, energy use, material costs, or other characteristics. The operator may select among the controllable characteristics. The genetic decision process may then select an evolutionary fit for the selected conditions. The contextual information may provide warnings or selection constraints where operator selections may be out-of-bounds with feasible solutions or where the possible solutions lead to negative outcomes.

In some cases, production plants may "bid" on production, e.g., by supplying cost and output metrics to the layout control system. The autopilot functions, such as the genetic decision process and the numerical model, may be used to coordinate these bids based on cost and production targets. In some implementations, a Paxos algorithm may be used in bid coordination.

The layout may also be used to determine areas or customers affected by operator decisions from the contextual information controls. When an area or customers may experience a service interruption or degradation due to system maintenance, the contextual information may provide an option (or automatically implement an option) to send push notifications to the affected areas or customers, e.g., email, text message, application-specific push notifications, or other notifications.

Similarly, the layout may be used to determine dynamic rerouting options to reduce or mitigate service interruptions. For example, a DMA may be able to be supplied by multiple principal mains. During or in advance of a service interruption, the contextual information may include options for rerouting using alternate principal mains. In another example, a node in a fluid service, e.g., water, gas, oil, network may be taken out of service, e.g., for maintenance. Rerouting may be performed to ensure reliable supply at the leaf edges of the network. To achieve the rerouting, the layout, e.g., the physical network model, may be used to determine the leaf edges affected by the service interruption. The layout may identify resources that may be reused and adjusted to mitigate the capacity change. Further, the auto-piloting functions may be used to dynamically adjust upstream and downstream flow, e.g., to avoid rapid pressure or flow changes that may lead to material degradation.

Figure 5:
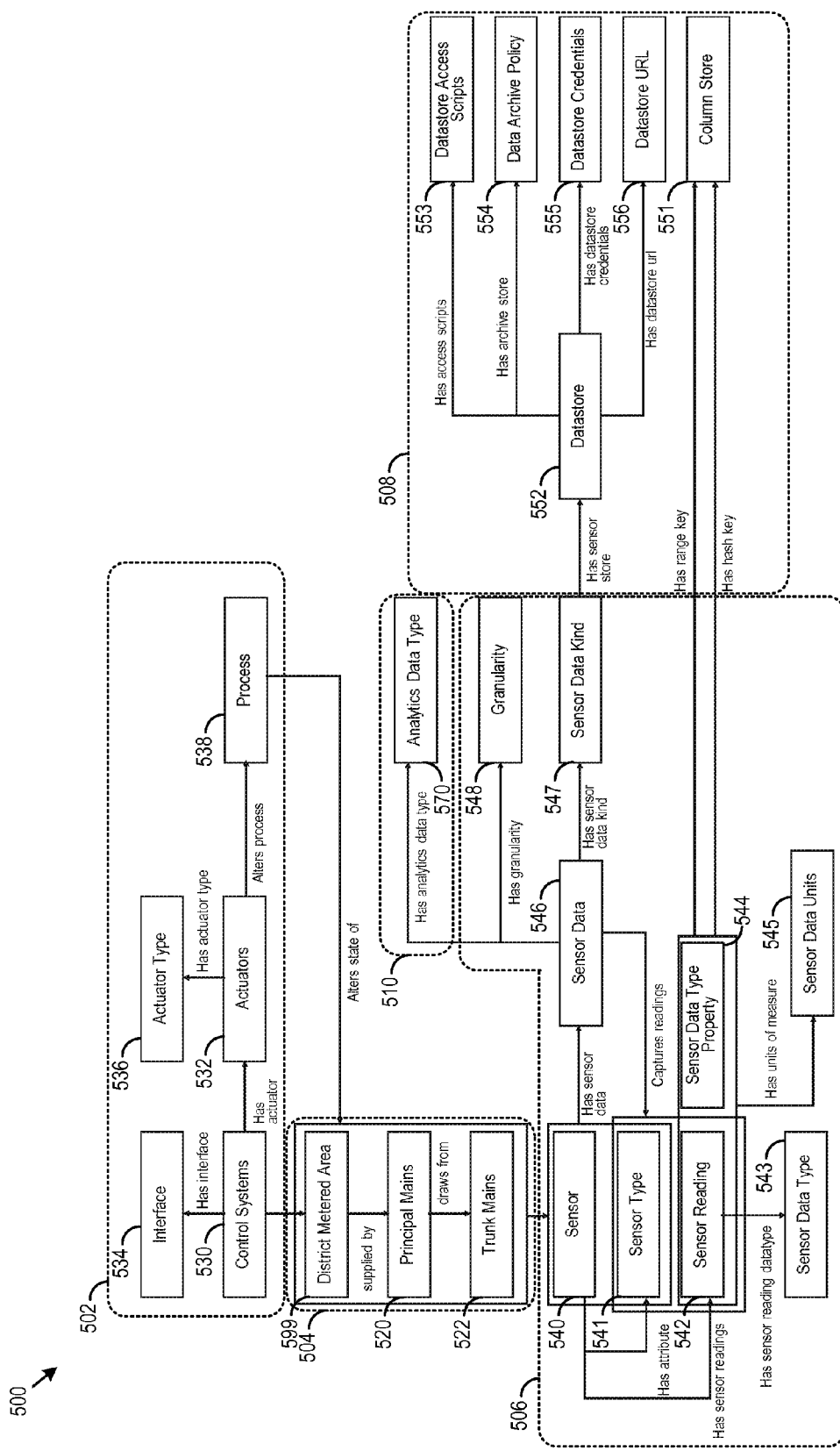
FIG. 5 shows an example knowledge layout.

FIG. 5 shows an example knowledge layout 500. The example knowledge layout 500 shows for a DMA 599. The example knowledge layout may include sub-layouts for the control and actuation system model 502, the physical system model 504, the monitoring model 506, the datastore model 508, and the analytics model 510. Within the models the various components for a valid system are included. For example, the example physical model has a DMA 599, supplied by a principal main 520, which draws from a trunk main 522. Instances missing one or more components or relationships in the sub-layouts may not necessarily be validated against the sub-layout when instantiated.

The control and actuation system model 502 includes control systems 530 which use actuators 532. The interface 534 may be used for operator control of the control systems 530. The actuators may be mapped to actuator types 536. The actuators 532 may affect processes 538. The processes 538 in turn alter the control states of the physical system model 504.

The monitoring model 506 may govern sensor data collection. Sensors 540 may have a sensor type 541 and collect sensor readings 542. The readings 542 may be collected as a particular data type 543. The data type may have properties 544 such as size or format. Sensor data may also have associated units 545. The sensor data 546 from the sensor 541 may have a sensor data kind 547 that informs data storage. The sensor data may also have a granularity 548.

The datastore model 508 may determine storage protocols. Data may be column stored 551 using range and hash keys. However, for multiple format or protocol data storage more resources may be mapped to base storage. Other data may be placed in datastores 552. The datastore may have associate access scripts 553, archive policies 554, credentials 555 and uniform resource locators (URLs) 556.

Over time, sensors can generate vast quantities of data. Layout databases may accommodate such data. However, in some cases, layout operations may be faster when smaller amounts of data are stored within the layout. The majority of the sensor data may not necessarily be in active use by the layout system. Therefore, in some cases, portions of the sensor data may be passed to datastores, e.g., object storage, cloud storage, data lakes, for storage outside the layout. References for retrieval of the data from the datastore may be held within the layout in place of the bulk data. The selection of the type of datastore used may be determined based on the sensor data kind attributed 547 to the sensor data 546.

The datastore credentials 555 may be stored in secure, e.g., encrypted storage. In some cases, a layout may include such secure storage. However, in some cases the credentials 555 may be stored such that the layout may use the credentials for access, but the credentials 555 may be stored in a separate secure location.

The analytics model 510 may define the analytical engines 570 used. In the example layout, the analytics model 510 interacts with the sensor data. However, more complex analytic models 510 may be used. In some cases, the analytics models 510 may interact with the datastore for governance of sensor data storage. Additionally or alternatively, the analytics model 510 may interact with the interface 534 and control systems 530 of the control and actuation system model 502 to govern the control state of the robotic system, e.g., in an autopilot mode as discussed above.

Figure 6:
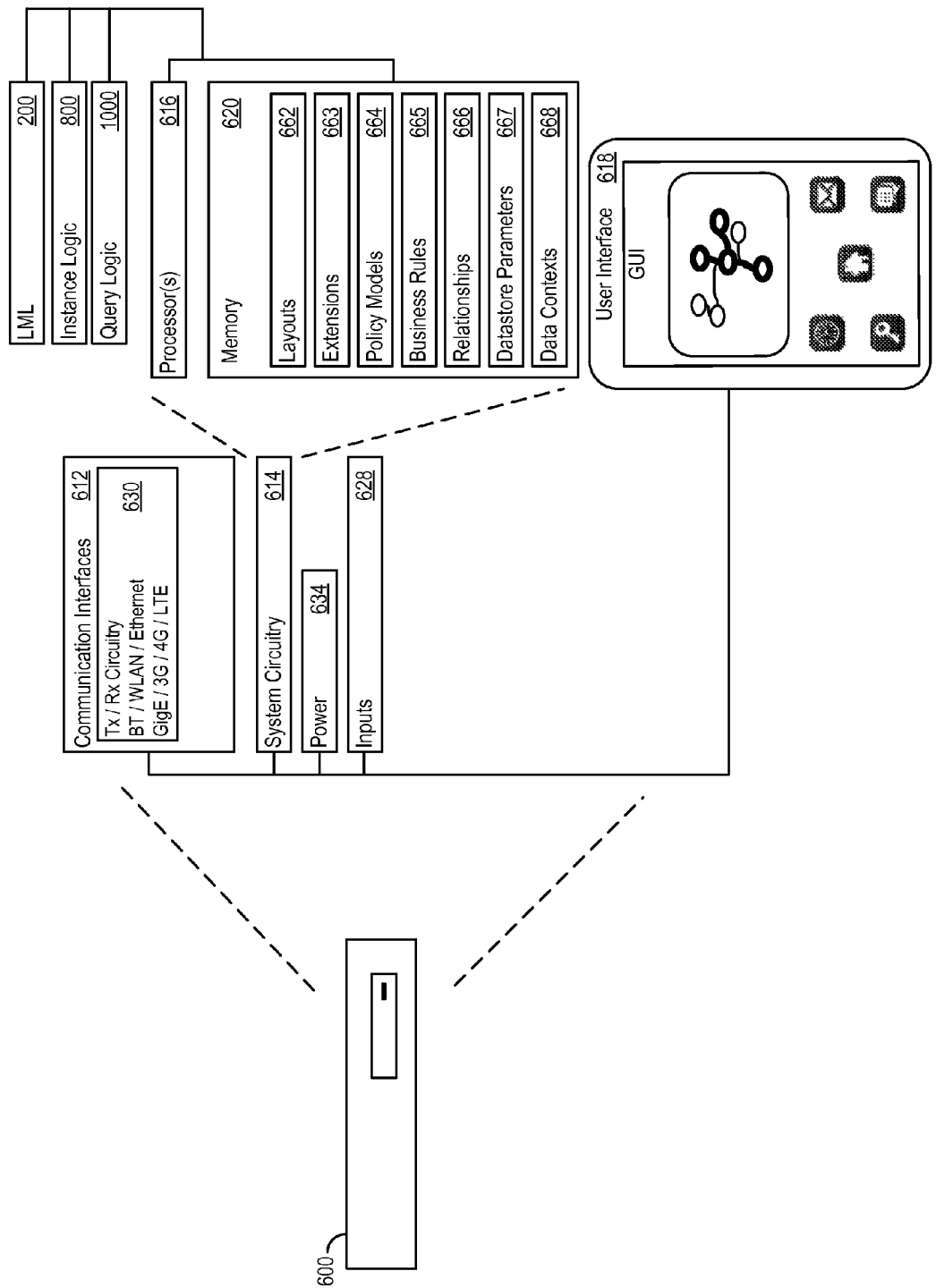
FIG. 6 shows an example specific execution environment.

FIG. 6 shows an example specific execution environment 600 for the system described above. The execution environment 600 may include system circuitry 614 to support execution and presentation of the visualizations described above. The system circuitry 614 may include processors 616, memory 620, and/or other circuitry. In various implementations, the system circuitry 614 may support execution of various ones of the LML 200, described above, or the instance logic 800 and the query logic 1000 described below.

The memory 620, may be used to store the data and/or media for available layouts 662; extensions 663; policy models 664; business rules 665, relationships 666, datastore parameters 667, and data contexts 668.

The execution environment 600 may also include commutation interfaces 612, which may support wireless, e.g. Bluetooth, Wi-Fi, WLAN, cellular (4G, LTE/A), and/or wired, ethernet, Gigabit ethernet, optical networking protocols. The communication interface may support communication with external or third-party servers. The execution environment 600 may include power functions 634 and various input interfaces 628. The execution environment may also include a user interface 618 that may include human interface devices and/or graphical user interfaces (GUI). The GUI may be used to present a management dashboard, actionable insights and/or other information to the user. In various implementations, the GUI may support portable access, such as, via a web-based GUI. In various implementations, the system logic 614 may be distributed over multiple physical servers and/or be implemented as one or more virtual machines.

Figure 7:
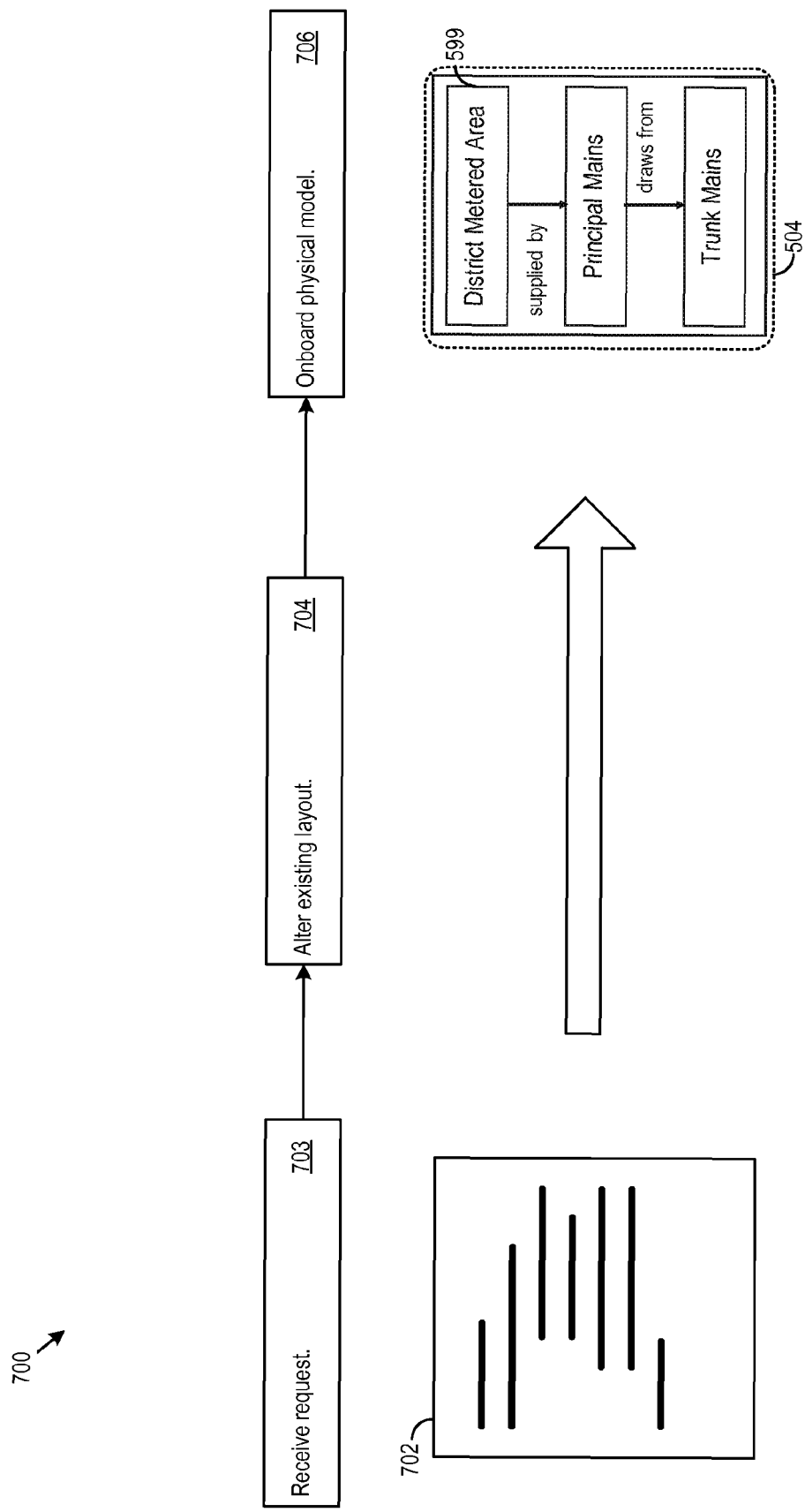
FIG. 7 shows example model onboarding by the LML.

FIG. 7 shows example model onboarding 700 by the LML 200. The LML 200 may receive a request 702 to onboard a sub-layout into an existing model. In the example 700 the request is to onboard the physical system model 504 portion of the example layout 500. In the example, the request 702 includes a pseudocode generated via an application programming interface (API) detailing the requested addition. The example pseudocode request includes:

```
{
    "Name": "Water Industry",
    "Relationships": [
        {
            "Domain": "Principal Mains",
            "Object Property": "draws water from",
            "Range": "Trunk Mains"
        }
    ]
}
```

However, the onboarding addition may alternatively be determined responsive to sensor input after a physical change is made to a system. In response to receiving the request (703), the LML 200 may alter (704) the existing layout as discussed above and onboard the physical model (706).

Figure 8:
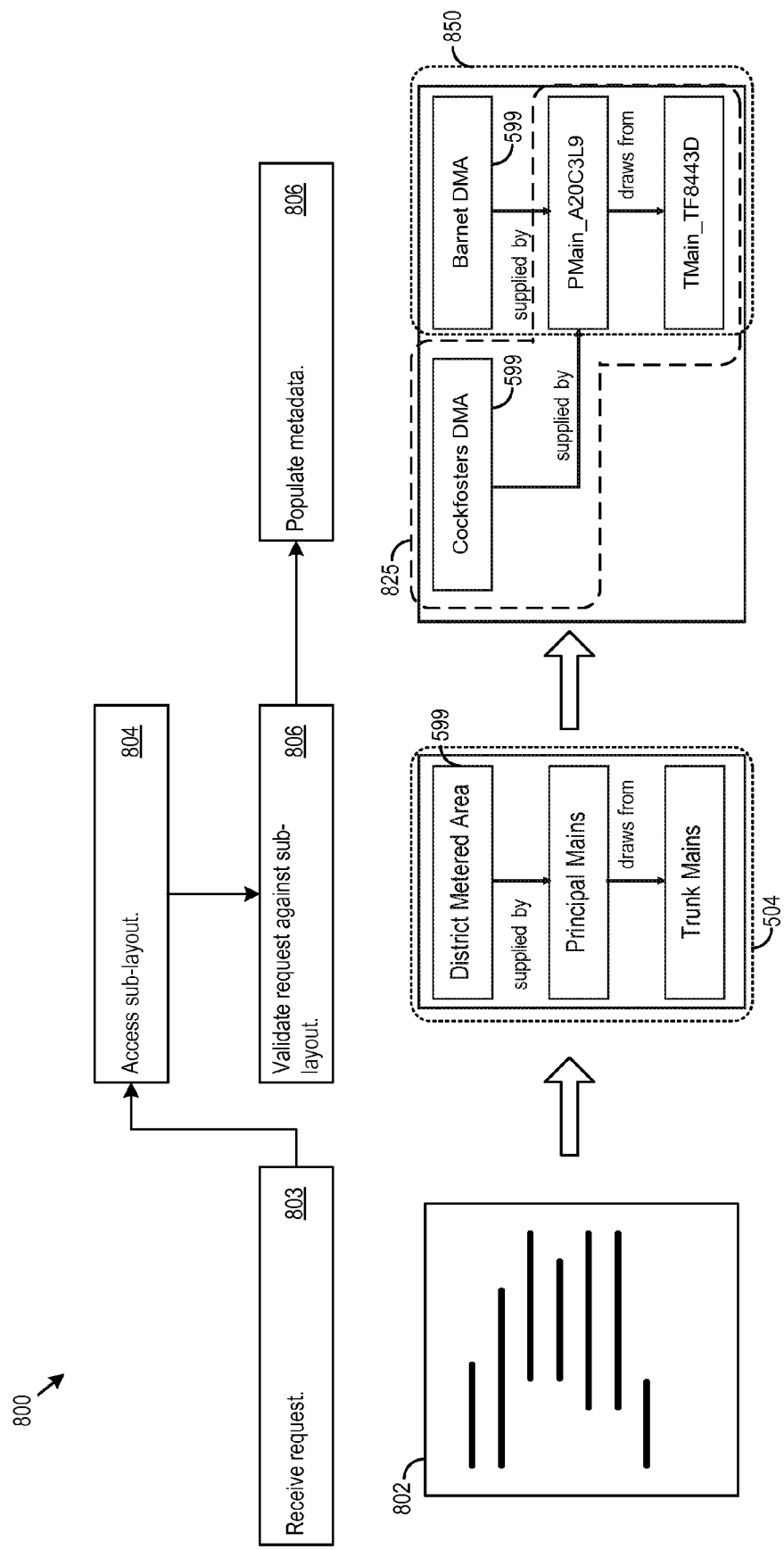
FIG. 8 shows example instance logic for instantiation of a sub-layout.

FIG. 8 shows example instance logic 800 for instantiation of a sub-layout. In the example, the components 599, 520, 522 are populated with metadata 801. The metadata details instances that may be validated against the physical system model 504. In the example, two parallel instances 825, 850 for two separate DMAs 599 are requested. The DMAs 599 share the same principal mains and trunk mains. However either or both of the mains components 520, 522 may be instantiated with differing metadata. Thus, the physical system model may be used to validate any number of instances. In the example, the request 802 includes pseudocode generated via an application programming interface (API) detailing the requested addition. The example pseudocode request includes:

```
{
    "Name": "Physical Network - London",
    "Nodes": [
        {
```

```
            "District Metered Area": "Cockfosters DMA",
            "District Metered Area": "Barnet DMA",
            "Principal Mains": "PMain__A20C3L9",
            "Trunk Mains": "TMain__TF8443D"
        }
    ]
    "Edges": [
        "supplied by": ["Cockfosters DMA", "PMain__A20C3L9"],
        "supplied by": ["Barnet DMA", "PMain__A20C3L9"],
        "draws from": ["PMain__A20C3L9", "TMain__TF8443D"]
    ]
}
```

The example instance logic 800 may receive the request (803). The example logic then accesses the corresponding sub-layout (804). The example instance logic 800 may then validate the request 802 against the corresponding sub-layout (806), which is the physical system model 504 in this example. Once validation is complete, the instance logic 800 may populate the metadata for the instances (808).

Figure 9:
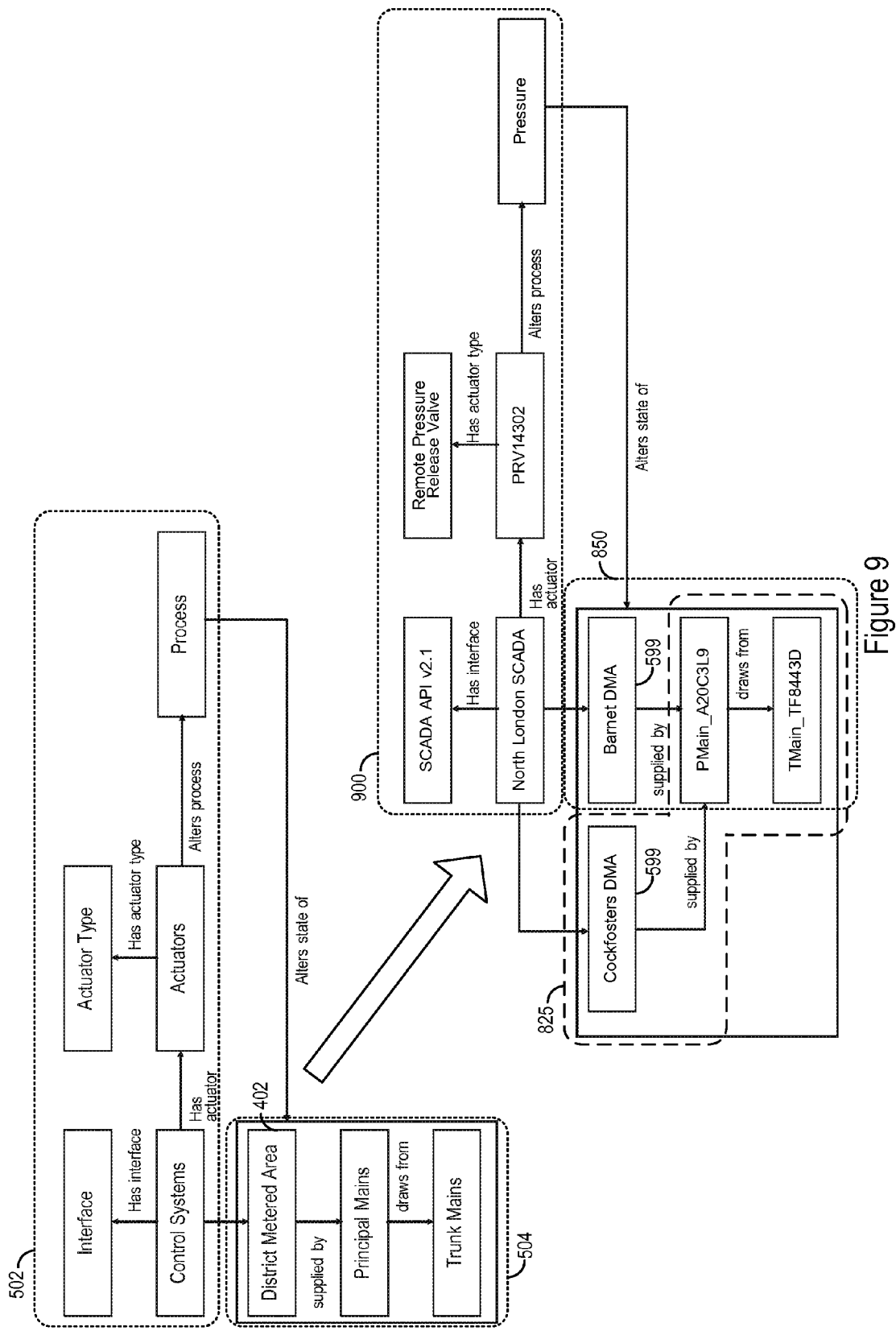
FIG. 9 shows example instantiations of the physical model and the control and actuation system model.

FIG. 9 shows example instantiations of the physical model 825, 850 and the control and actuation system model 900. In the example, the sub-layouts for the control and actuation system model 502 and the physical system model 504 are shown alongside example instances 825, 850, 900 with populated metadata. In the example, the instance 900 of the control and actuation system model 502 is interacting with a common component the parallel instances 825, 850 of the physical system model 504.

Figure 10:
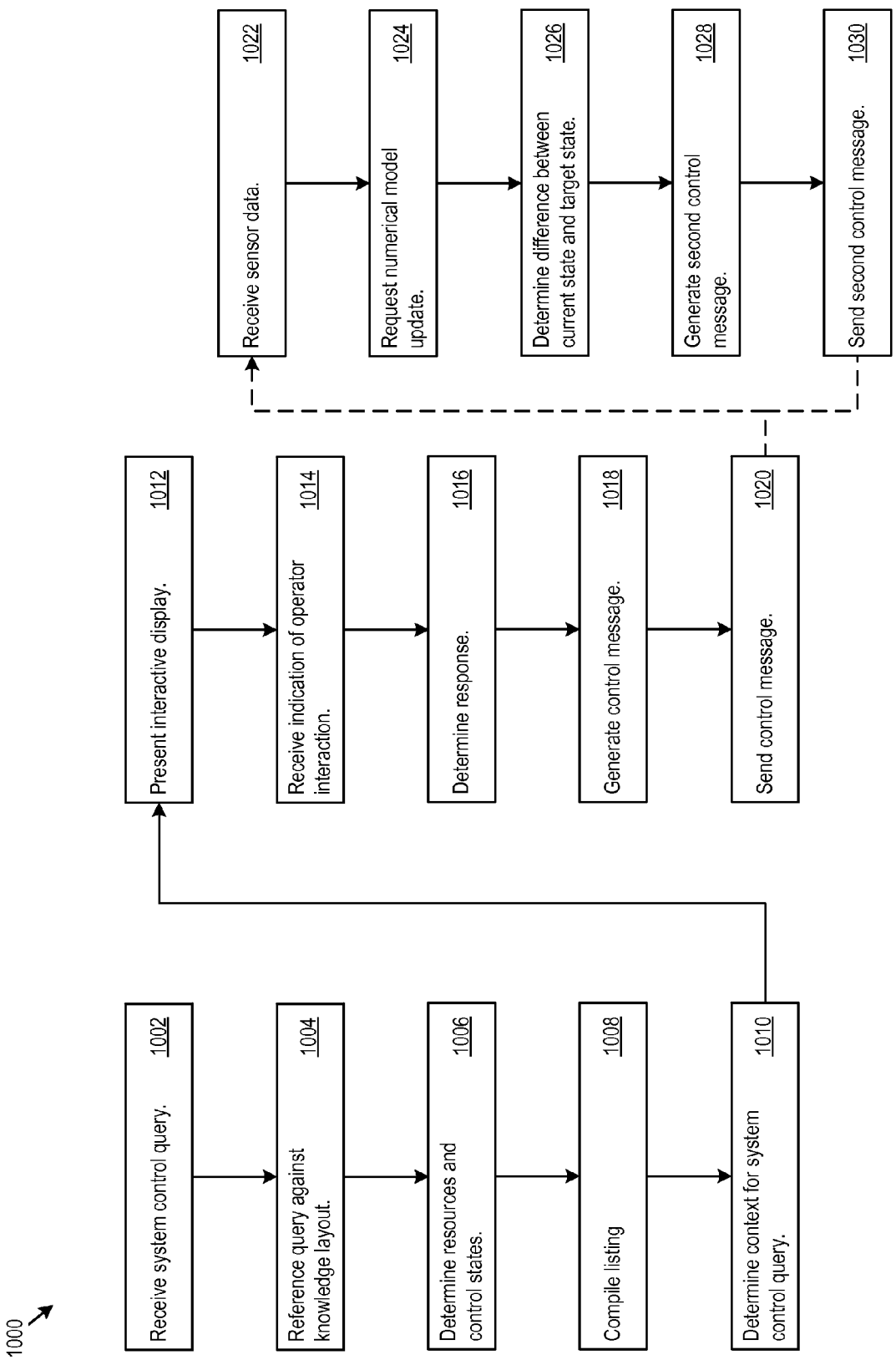
FIG. 10 shows example query logic.

FIG. 10 shows example query logic 1000 which may be implemented on circuitry. The query logic 1000 may receive a system control query for a robotic device from an operator (1002). For example, an operator may send a query about requesting pressure control options for a DMA controlled via multiple robotic devices, e.g., valves, pumps, turbines or other devices. The query logic 1000 may reference the query against a knowledge layout for control of the robotic device (1004). Using the layout, the query logic 1000 may determine resources and control states corresponding to the system control query (1006). In the DMA example, the layout may indicate flow relationships such as "supplied by" or "draws from". Managing flows using these relationships and resources may provide pressure control options related to the example query. The query logic 1000 may also reference previous similar queries and determine which resources or control states were eventually accessed by the operators that made the historical queries. Responsive to the determination, the query logic may compile the determined resources in a listing, which may be ranked (1008). The ranking may be by metrics such as "last accessed", "frequency accessed", "relevance to query", "date first available", "frequency accessed by specific operator", "degree of node/object connectivity", "references to the query within documentation", "current condition, e.g. warning state/alert" or other metrics. In some cases, ranking may be determined by previous queries made by an individual or by the likely role an individual plays. For example, site operators may prioritize rankings for events within their purview. The purview of a site operator may be defined by security protocols, site preferences, user associations, access levels, or other permissions definitions.

The query logic 1000 may also reference the layout to determine a context for the system control query (1010). For example, the system control query may produce search results which are concentrated in on portion of the layout.

For example, hits may be concentrated in the physical system model. In the example, the query logic may collect contextual information such as tutorials, models, descriptions, interactive tools, autopilot selections, or other resources related to the physical system model. In another example, the query logic 1000 may compile contextual information from the search results using ranking metrics or layout relationships. The contextual information depends on the relationships between nodes. The relationships may be whether direct or indirect. The query logic 1000 may capture indirect references through the extended knowledge layout. As such, the contextual information that accompanies the search depends on the class of object/entity being searched. If the query indicates that a 'person' is being searched for, relevant demographic information may be displayed, e.g., name, role, and contact. For example, if that same 'person' also is mapped through a path in the knowledge layout to 'site manager' then additional information on sites managed is also included. If that same 'person' is mapped to an 'executive' then information, such as reports for operations under the control of the executive, may be included. Depending on the context, the contextual search may return the results just for a 'person', 'site manager,' or 'executive.' For example, for a human resources user, the results for 'person' and 'executive' are prioritized. In another example, for an operations dashboard, 'site manager' related results are prioritized. If an industrial component or plant is being searched for, the class of that component or plant may be used by the query logic 1000 to determine the contextual information that is returned to the user). For example the search component may be included as part of an asset family (e.g., all pumps), as part of a logical supply chain or network (e.g., as part of the water flow from a reservoir to a neighborhood), as part of an equipment manifest (e.g., equipment from a manufacturer, or equipment still under a 3 year warranty). These relationships may be mapped either directly or indirectly within the knowledge layout.

Once the search results and contextual information are collected, the query logic 1000 may present the search results and contextual information in an interactive display (1012). The query logic 1000 may receive an indication of an interaction from the operator (1014). For example, the operator may select a search result or interact with a tool in the contextual information.

The query logic 1000 may determine an operator-desired response based on the interaction (1016). For example, the query logic 1000 may determine that the operator command requested a change in the control state of the robotic device, e.g., actuator movement. In another example, the query logic 1000 may determine that the operator command included a request for a dynamic model update or an update to the layout. In another example, a target control state may be selected by the operator. The query logic 1000 may generate a control message to execute the operator desired response (1018). For example, the query logic 1000 may generate a control state update message to cause a robotic device to perform an action. In another example, the query logic may generate a request for the LML 200 to perform onboarding, removal, or another update to the layout. The query logic 1000 may also generate request for a dynamic model update to support operator experimentation ahead of command submission to a robotic device. In some cases, query logic 1000 may send the control message via a commination interface, e.g., for network transmission (1020).

For autopilot selections, the query logic 1000 may generate in initial control message to begin moving the system towards a target state. The query logic 1000 may receive sensor data after sending the initial control message (1022). The query logic 1000 may request a numerical model update (1024). Responsive to the sensor data and the numerical model update, the query logic 1000 may determine that the current state of the system differs from the target control state (1026). Based on the difference, the query logic 1000 may generate a second control message (1028), e.g., to provide additional correction to the system state. The query logic 1000 may cause the communication interface to send the second control message (1030). The query logic may return to sensor data monitoring to hold the control state at the target control state (1022).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:
1. A system comprising:
   a robotic apparatus;

memory configured to store a resource model, the resource model comprising a mapping of a resource for management to a control state of the robotic apparatus configured to control an industrial process, the mapping comprising relationship data for the resource and the control state;

sensor circuitry configured to capture control state data;

communication interface circuitry configured to transmit control state update instructions to the robotic apparatus; and system control circuitry, in data communication with the memory and the communication interface circuitry, the system control circuitry configured to:

receive, through the communication interface circuitry, a system control query associated with the robotic apparatus;

reference the system control query against the resource model to generate contextual information and a search result for the system control query by comparing the system control query to descriptors of resources, relationship data, control states, or any combination thereof mapped within the resource model;

via the communication interface circuitry, cause generation of an interactive display comprising the contextual information along with the search result;

generate a prediction of an effect of submission of a control state update command on the industrial process responsive to the control state update command resulting from user interaction with the interactive display;

via the communication interface circuitry, update the interactive display to include:
an indication of the prediction; and
a graphical prompt including an option to submit the control state update command to the robotic apparatus;

create a first control state update instruction for the robotic apparatus responsive to selection of the option to submit;

cause the communication interface circuitry to transmit the first control state update instruction to the robotic apparatus;

after the first control state update instruction is transmitted, determine to iteratively correct the control state responsive to the selection of the option to submit and the control state data;

create a second control state update instruction for the robotic apparatus responsive to determining to iteratively correct the control state; and cause the communication interface circuitry to transmit the second control state update instruction to the robotic apparatus.

2. The system of claim 1, where the robotic apparatus comprises an actuator device.

3. The system of claim 1, where the robotic apparatus is configured to control fluid flow.

4. The system of claim 3, where the robotic apparatus comprises a portion of a control system for water circulation system.

5. The system of claim 1, where the contextual information comprises data collected from a first object storage database and a second object storage database.

6. The system of claim 5, where:

a first storage protocol for the first object storage database is different from a second storage protocol for the second object storage database; and the system control circuitry is configured to obtain the contextual information by accessing the first object storage database in accord with the first storage protocol and accessing the second object storage database in accord with the second storage protocol.

7. The system of claim 6, where the interactive display is configured to present the contextual information without indication of the first and second storage protocols.

8. The system of claim 6, where the relationship data comprises a first indicator for the first storage protocol and a second indicator for the second storage protocol.

9. The system of claim 1, where the resource comprises a database location, a control command for the robotic apparatus, a control address for the robotic apparatus, or any combination thereof.

10. The system of claim 1, where the interactive display is generated using a touchscreen display, a movable cursor, graphical user interface, or any combination thereof.

11. A method comprising:

receiving a system control query associated with a robotic apparatus;

referencing, using a processor, the system control query against a resource model to generate contextual information and a first search result for the system control query by comparing the system control query to descriptors of resources, relationship data, control states, or any combination thereof mapped within the resource model, where the resource model comprising a mapping of a resource for management to a control state of the robotic apparatus, the mapping comprising relationship data for the resource and the control state, the robotic apparatus configured to control an industrial process;

via communication interface circuitry coupled to the processor, causing generation of an interactive display comprising the contextual information along with the first search result;

causing the processor to generate a prediction of an effect of submission of a control state update command on the industrial process responsive to the control state update command resulting from user interaction with the interactive display;

via the communication interface circuitry, updating the interactive display to include:
an indication of the prediction; and
a graphical prompt including an option to submit the control state update command to the robotic apparatus;

creating, using the processor, a first control state update instruction for the robotic apparatus responsive to selection of the option to submit;

transmitting, via the communication interface circuitry, the first control state update instruction to the robotic apparatus; and after the first control state update instruction is transmitted:

receiving control state data via sensor circuitry;

determining to iteratively correct the control state responsive to the selection of the option to submit and the control state data;

generating a second control state update instruction for the robotic apparatus responsive to determining to iteratively correct the control state; and transmitting, via the communication interface circuitry, the second control state update instruction to the robotic apparatus.

12. The method of claim 11, further comprising compiling the contextual information from data available through the first search result and a second search result.

13. The method of claim 11, further comprising accessing the resource for management to generate the control state update instruction.

14. The method of claim 11, where the contextual information comprises first data collected from a first object storage database.

15. The method of claim 14, where the relationship data comprises an index for accessing the first data in the first object storage database.

16. The method of claim 11, where the user interaction comprises an adjustment of a target control state setting for the robotic apparatus; and
generating the second control state update instruction comprises generating a first series of control state update instructions to comply with the adjustment to the target control state setting.

17. The method of claim 16, further comprising generating a second series of control state update instructions to hold the control state of the robotic apparatus in accord with the target control state setting.

18. The method of claim 17, wherein the robotic apparatus comprises a multiple actuators in a water-utility flow control system; and
the target control state setting comprises a target flow setting, a target pressure setting, or both.

19. A system comprising:
memory configured to store a resource model, the resource model comprising a mapping of resources within multiple object storage databases, the mapping comprising relationship data to support access of the resources within the multiple object storage databases;
communication interface circuitry configured to:
access the resources in the multiple object storage databases in accord with the relationship data;
transmit control state update instructions to a robotic apparatus; and
system control circuitry, in data communication with the memory and the communication interface circuitry, the system control circuitry configured to:
receive a system control query associated with the robotic apparatus;
reference the system control query against the resource model to generate contextual information and a search result for the system control query, the contextual information comprising:
a selector tool for selection of a target control state; and
an indicator of an initial control state;
generate an interactive display comprising the contextual information along with the search result;
determine the target control state for the robotic apparatus responsive to a user interaction with the selector tool;
create a first control state update instruction for the robotic apparatus responsive to an initial difference between the target control state and the initial control state;
cause the communication interface circuitry to transmit the first control state update instruction to the robotic apparatus;
after transmission of the first control state update instruction, receive sensor data;
reference the sensor data against the resource model to determine a current control state for the robotic apparatus;
determine a current difference between the current control state and the target control state;
create a second control state update instruction for the robotic apparatus responsive to the current difference; and
cause the communication interface circuitry to transmit the second control state update instruction to the robotic apparatus.

20. The system of claim 19, where the system control circuitry is configured to determine the current difference between the current control state and the target control state by executing a genetic decision process configured to meet a constraint set via the selector tool.

* * * * *